(12) United States Patent
Van Nee et al.

(10) Patent No.: US 8,385,443 B2
(45) Date of Patent: Feb. 26, 2013

(54) CONSTRUCTING VERY HIGH THROUGHPUT LONG TRAINING FIELD SEQUENCES

(75) Inventors: Richard Van Nee, De Meern (NL); Lin Yang, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 12/731,634

(22) Filed: Mar. 25, 2010

(65) Prior Publication Data
US 2011/0013607 A1    Jan. 20, 2011

Related U.S. Application Data

(60) Provisional application No. 61/226,615, filed on Jul. 17, 2009.

(51) Int. Cl.
*H04L 27/28* (2006.01)
*H04K 1/10* (2006.01)

(52) U.S. Cl. ........ 375/260; 375/267; 375/295; 375/299; 370/334; 455/101

(58) Field of Classification Search .......... 375/260, 375/267, 295, 299; 455/101; 370/334
See application file for complete search history.

(56) References Cited

U.S. PATENT DOCUMENTS

| 2005/0078707 | A1* | 4/2005 | Maltsev et al. ............... 370/471 |
| 2005/0152473 | A1* | 7/2005 | Maltsev et al. ............... 375/299 |
| 2011/0194544 | A1  | 8/2011 | Yang et al.                           |

OTHER PUBLICATIONS

Syafei W., et al., "A Gigabit MIMO WLAN system with international standardization strategy," Ntelligent Signal Processing and Communication Systems, 2009, 228-231.
Vermani, Saamer: "VHT-LTF sequence for 80 MHz" IEEE 802.11-10/0802R0, [Online] Jul. 12, 2010, pp. 1-12, XP002616238, Retrieved from the Internet: URL:https://mentor.i eee.org/802.1I/dcn/10/II-10-0802-00-00ac-vht-ltf-sequence-for-80-mhz.pptx> [retrieved on Jan. 10, 2011].
Wahyul Amien Syafei et al., "A design of next generation Gigabit MIMO wireless LAN system", Advanced Communication Technology (ICACT), 2010 the 12th International Conference on, IEEE, Piscataway, NJ, USA, Feb. 7, 2010, pp. 941-946, XP031653679, ISBN: 978-1-4244-5427-3.
Draft Standard for Information Technology Telecommunications and information exchange between systems. Local and metropolitan area networks Specific requirements Part 11: Wireless LAN Medium Access Control (MAC) and Physical Layer (PHY) specifications Amendment 5 Enhancements for Higher Throughput IEEE P802.11N/D9.0, Mar. 1, 2009, pp. 1,2,276-297, XP002606795. IEEE P802.11n/D9.0 Retrieved from the Internet: URL:http://ieeexplore.ieee.org/stamp/stamp.jsp"tp=&arnumber=4810960 [retrieved on Oct. 25, 2010] p. 278 p. 292 p. 29.
International Search Report and Written Opinion—PCT/US2010/041853, International Search Authority—European Patent Office—Nov. 8, 2010.

(Continued)

*Primary Examiner* — Ted Wang
(74) *Attorney, Agent, or Firm* — Kenyon S. Jenckes

(57) ABSTRACT

Certain aspects of the present disclosure relate to techniques for constructing a long training field (LTF) sequence in a preamble to reduce a peak-to-average power ratio (PAPR) at a transmitter.

43 Claims, 16 Drawing Sheets

OTHER PUBLICATIONS

Lanante L, et al., "IEEE802.11ac Preamble with Legacy 802.11a/n Backward Compatibility", IEEE 802.11-YY/0847R0, [Online] Jul. 14, 2009, pp. 1-18, XP002606794, Retrieved from the Internet: URL:http://www.google.de/url''sa=t&source=web&cd=3&ved=0 CBgQFjAC&url=https%3A%2F%2Fmentor.ieee.org%2F802.11% 2Fdcn%2F10%2F11-10-0791-02-00ac-phase-rotation-for-the-80-mhz-802-11ac-mixed-mode-packet.ppt&ei=u3bFT07TE8qh4Qb Zko26Aw&usg=AFQjCNHYliVl8HNnsZmesHd33saVGqWpOw> [retrieved on Oct. 25, 2010] pp. 3-12.

Sean Coffey, Adrian Stephens: "IEEE P802.11 Wireless LANs. Joint Proposal: High throughput extension to the 802.11 Standard: PHY" IEEE, Piscataway, NJ, USA 0RD—0000-00-00, Jan. 10, 2006, pp. 1-32, XP040385527 pp. 8, 12, 13.

* cited by examiner

| $\dfrac{\max\{abs(x(n))^2\}_{n=0}^{N-1}}{\sum_{n=0}^{N-1} abs(x(n))^2 / N}$ | min. PAPR [dB] |
|---|---|
| No Rotation 80Msps (IFFT 256) | 8.0785 |
| With Rotation 80Msps (IFFT 256) | 5.2767 |
| No Rotation 320Msps (IFFT 1024) | 8.0785 |
| With Rotation 320Msps (IFFT 1024) | 7.6909 |
| No Rotation 320Msps (IFFT 256 + 4x TDI) | 8.7891 |
| With Rotation 320Msps (IFFT 256 + 4x TDI) | 5.8816 |

FIG. 5

| $\dfrac{\max\{abs(x(n))^2\}_{n=0}^{N-1}}{\sum_{n=0}^{N-1} abs(x(n))^2 / N}$ | min. PAPR [dB] |
|---|---|
| No Rotation 80Msps (IFFT 256) | 7.8187 |
| With Rotation 80Msps (IFFT 256) | 5.0837 |
| No Rotation 320Msps (IFFT 1024) | 7.8187 |
| With Rotation 320Msps (IFFT 1024) | 7.6099 |
| No Rotation 320Msps (IFFT 256 + 4x TDI) | 8.5841 |
| With Rotation 320Msps (IFFT 256 + 4x TDI) | 6.0423 |

FIG. 6

| [c1 c2 c3 c4] = [1 1 1 -1] | min. PAPR [dB] |
|---|---|
| No Rotation 80Msps (IFFT 256) | 3.4366 |
| With Rotation 80Msps (IFFT 256) | 4.8468 |
| No Rotation 320Msps (IFFT 1024) | 4.4944 |
| With Rotation 320Msps (IFFT 1024) | 5.0629 |
| No Rotation 320Msps (IFFT 256 + 4x TDI) | 4.9424 |
| With Rotation 320Msps (IFFT 256 + 4x TDI) | 6.0833 |

| [c1 c2 c3 c4] = [1 1 -1 1] | min. PAPR [dB] |
|---|---|
| No Rotation 80Msps (IFFT 256) | 3.5357 |
| With Rotation 80Msps (IFFT 256) | 5.2432 |
| No Rotation 320Msps (IFFT 1024) | 4.8438 |
| With Rotation 320Msps (IFFT 1024) | 5.3864 |
| No Rotation 320Msps (IFFT 256 + 4x TDI) | 5.2719 |
| With Rotation 320Msps (IFFT 256 + 4x TDI) | 6.4060 |

| [c1 c2 c3 c4] = [1 -1 1 1] | min. PAPR [dB] |
|---|---|
| No Rotation 80Msps (IFFT 256) | 3.4239 |
| With Rotation 80Msps (IFFT 256) | 4.8861 |
| No Rotation 320Msps (IFFT 1024) | 4.6403 |
| With Rotation 320Msps (IFFT 1024) | 4.9922 |
| No Rotation 320Msps (IFFT 256 + 4x TDI) | 4.9266 |
| With Rotation 320Msps (IFFT 256 + 4x TDI) | 6.0348 |

| [c1 c2 c3 c4] = [-1 1 1 1] | min. PAPR [dB] |
|---|---|
| No Rotation 80Msps (IFFT 256) | 3.5368 |
| With Rotation 80Msps (IFFT 256) | 5.2611 |
| No Rotation 320Msps (IFFT 1024) | 4.5786 |
| With Rotation 320Msps (IFFT 1024) | 5.3565 |
| No Rotation 320Msps (IFFT 256 + 4x TDI) | 5.0763 |
| With Rotation 320Msps (IFFT 256 + 4x TDI) | 6.2690 |

FIG. 7A

| [c1 c2 c3 c4] = [1 j 1 -j] | min. PAPR [dB] |
|---|---|
| No Rotation 80Msps (IFFT 256) | 3.4813 |
| With Rotation 80Msps (IFFT 256) | 5.1868 |
| No Rotation 320Msps (IFFT 1024) | 5.1234 |
| With Rotation 320Msps (IFFT 1024) | 5.2288 |
| No Rotation 320Msps (IFFT 256 + 4x TDI) | 5.0341 |
| With Rotation 320Msps (IFFT 256 + 4x TDI) | 5.8913 |

| [c1 c2 c3 c4] = [1 j -1 j] | min. PAPR [dB] |
|---|---|
| No Rotation 80Msps (IFFT 256) | 4.1006 |
| With Rotation 80Msps (IFFT 256) | 5.2725 |
| No Rotation 320Msps (IFFT 1024) | 5.4490 |
| With Rotation 320Msps (IFFT 1024) | 5.4001 |
| No Rotation 320Msps (IFFT 256 + 4x TDI) | 5.6143 |
| With Rotation 320Msps (IFFT 256 + 4x TDI) | 6.0108 |

| [c1 c2 c3 c4] = [j 1 j -1] | min. PAPR [dB] |
|---|---|
| No Rotation 80Msps (IFFT 256) | 4.1006 |
| With Rotation 80Msps (IFFT 256) | 5.2725 |
| No Rotation 320Msps (IFFT 1024) | 5.4800 |
| With Rotation 320Msps (IFFT 1024) | 5.3783 |
| No Rotation 320Msps (IFFT 256 + 4x TDI) | 5.5364 |
| With Rotation 320Msps (IFFT 256 + 4x TDI) | 5.9318 |

| [c1 c2 c3 c4] = [j 1 -j 1] | min. PAPR [dB] |
|---|---|
| No Rotation 80Msps (IFFT 256) | 3.5879 |
| With Rotation 80Msps (IFFT 256) | 5.1868 |
| No Rotation 320Msps (IFFT 1024) | 5.4177 |
| With Rotation 320Msps (IFFT 1024) | 5.2274 |
| No Rotation 320Msps (IFFT 256 + 4x TDI) | 5.0978 |
| With Rotation 320Msps (IFFT 256 + 4x TDI) | 5.9297 |

FIG. 7B

| Cases | min. PAPR [dB] | [c1 c2 c3 c4] | [ interp20Null, interp40Null, interp80ExtraL, interp80ExtraR ] |
|---|---|---|---|
| No Rotation 80Msps (IFFT 256) | 3.4239 | [1 -1 1 1] | [-1, -1 -1 -1 -1 1 1 -1 -1 -1 -1 -1, 1 1 1 -1, -1 1 1 -1] |
| With Rotation 80Msps (IFFT 256) | 4.8468 | [1 1 1 -1] | [1, -1 1 -1 -1 1 1 -1 -1 -1 -1 -1 -1, -1 -1 1 1, -1 1 1 1] |
| No Rotation 320Msps (IFFT 1024) | 4.4944 | [1 1 1 -1] | [1, -1 -1 1 1 -1 1 -1 -1 -1 1 -1, 1 1 -1 -1, -1 1 1 1] |
| With Rotation 320Msps (IFFT 1024) | 4.9922 | [1 -1 1 1] | [1, -1 -1 -1 1 1 -1 -1 -1 1 1 -1, 1 1 -1 1, 1 1 -1] |
| No Rotation 320Msps (IFFT 256 + 4x TDI) | 4.9266 | [1 1 1 1] | [1, 1 -1 -1 -1 -1 1 -1 -1 1 -1 -1, -1 -1 1, 1 -1 -1 -1] |
| With Rotation 320Msps (IFFT 256 + 4x TDI) | 5.8913 | [1 j 1 -j] | [1, 1 -1 -1 -1 1 1 -1 -1 1 -1 -1 1, -1 -1 -1 -1, 1 1] |

FIG. 8

| [c1 c2 c3 c4] = [1 1 1 -1] | min. PAPR [dB] |
|---|---|
| No Rotation 80Msps (IFFT 256) | 3.8738 |
| With Rotation 80Msps (IFFT 256) | 5.1550 |
| No Rotation 320Msps (IFFT 1024) | 4.9010 |
| With Rotation 320Msps (IFFT 1024) | 5.3733 |
| No Rotation 320Msps (IFFT 256 + 4x TDI) | 5.0969 |
| With Rotation 320Msps (IFFT 256 + 4x TDI) | 6.1641 |

| [c1 c2 c3 c4] = [1 -1 1 1] | min. PAPR [dB] |
|---|---|
| No Rotation 80Msps (IFFT 256) | 3.8738 |
| With Rotation 80Msps (IFFT 256) | 4.9271 |
| No Rotation 320Msps (IFFT 1024) | 4.6576 |
| With Rotation 320Msps (IFFT 1024) | 4.9922 |
| No Rotation 320Msps (IFFT 256 + 4x TDI) | 4.9964 |
| With Rotation 320Msps (IFFT 256 + 4x TDI) | 6.2057 |

| [c1 c2 c3 c4] = [1 1 -1 1] | min. PAPR [dB] |
|---|---|
| No Rotation 80Msps (IFFT 256) | 3.7082 |
| With Rotation 80Msps (IFFT 256) | 5.7557 |
| No Rotation 320Msps (IFFT 1024) | 5.0265 |
| With Rotation 320Msps (IFFT 1024) | 5.7557 |
| No Rotation 320Msps (IFFT 256 + 4x TDI) | 5.5703 |
| With Rotation 320Msps (IFFT 256 + 4x TDI) | 6.8867 |

| [c1 c2 c3 c4] = [-1 1 1 1] | min. PAPR [dB] |
|---|---|
| No Rotation 80Msps (IFFT 256) | 3.7082 |
| With Rotation 80Msps (IFFT 256) | 5.6264 |
| No Rotation 320Msps (IFFT 1024) | 5.1906 |
| With Rotation 320Msps (IFFT 1024) | 5.7083 |
| No Rotation 320Msps (IFFT 256 + 4x TDI) | 5.5874 |
| With Rotation 320Msps (IFFT 256 + 4x TDI) | 7.1094 |

FIG. 9A

| [c1 c2 c3 c4] = [1 j 1 -j] | min. PAPR [dB] |
|---|---|
| No Rotation 80Msps (IFFT 256) | 3.8738 |
| With Rotation 80Msps (IFFT 256) | 5.2767 |
| No Rotation 320Msps (IFFT 1024) | 5.4861 |
| With Rotation 320Msps (IFFT 1024) | 5.3215 |
| No Rotation 320Msps (IFFT 256 + 4x TDI) | 5.5019 |
| With Rotation 320Msps (IFFT 256 + 4x TDI) | 6.2005 |

| [c1 c2 c3 c4] = [1 j -1 j] | min. PAPR [dB] |
|---|---|
| No Rotation 80Msps (IFFT 256) | 4.4327 |
| With Rotation 80Msps (IFFT 256) | 5.6360 |
| No Rotation 320Msps (IFFT 1024) | 5.9130 |
| With Rotation 320Msps (IFFT 1024) | 5.7461 |
| No Rotation 320Msps (IFFT 256 + 4x TDI) | 5.8277 |
| With Rotation 320Msps (IFFT 256 + 4x TDI) | 6.3418 |

| [c1 c2 c3 c4] = [j 1 j -1] | min. PAPR [dB] |
|---|---|
| No Rotation 80Msps (IFFT 256) | 4.4327 |
| With Rotation 80Msps (IFFT 256) | 5.6347 |
| No Rotation 320Msps (IFFT 1024) | 5.9138 |
| With Rotation 320Msps (IFFT 1024) | 5.6946 |
| No Rotation 320Msps (IFFT 256 + 4x TDI) | 5.8452 |
| With Rotation 320Msps (IFFT 256 + 4x TDI) | 6.2748 |

| [c1 c2 c3 c4] = [j 1 -j 1] | min. PAPR [dB] |
|---|---|
| No Rotation 80Msps (IFFT 256) | 3.7082 |
| With Rotation 80Msps (IFFT 256) | 5.2767 |
| No Rotation 320Msps (IFFT 1024) | 5.6645 |
| With Rotation 320Msps (IFFT 1024) | 5.4383 |
| No Rotation 320Msps (IFFT 256 + 4x TDI) | 5.2171 |
| With Rotation 320Msps (IFFT 256 + 4x TDI) | 5.9944 |

FIG. 9B

| Cases | min. PAPR [dB] | [c1 c2 c3 c4] | [interp40Null, interp80ExtraL, interp80ExtraR] |
|---|---|---|---|
| No Rotation 80Msps (IFFT 256) | 3.7082 | [1 1 -1 1] or [-1 1 1 1] | |
| With Rotation 80Msps (IFFT 256) | 4.9271 | [1 -1 1 1] | [1 1 -1, 1 -1 -1, 1 -1 -1] |
| No Rotation 320Msps (IFFT 1024) | 4.6576 | [1 -1 1 1] | [1 -1 1, -1 -1 1 1, 1 1 1 -1] |
| With Rotation 320Msps (IFFT 1024) | 4.9922 | [1 -1 1 1] | [1 -1 1, 1 -1 1 1, 1 1 1 -1] |
| No Rotation 320Msps (IFFT 256 + 4x TDI) | 4.9964 | [1 -1 1 1] | [1 1 1, 1 -1 -1, -1 1 -1] |
| With Rotation 320Msps (IFFT 256 + 4x TDI) | 5.9944 | [j 1 -j 1] | [1 -1 1, 1 -1 -1, -1 1 -1] |

FIG. 10

| [c1 c2 c3 c4] = [1 1 1 -1] | min. PAPR [dB] |
|---|---|
| No Rotation 80Msps (IFFT 256) | 3.3233 |
| With Rotation 80Msps (IFFT 256) | 5.3687 |
| No Rotation 320Msps (IFFT 1024) | 4.8187 |
| With Rotation 320Msps (IFFT 1024) | 5.3687 |
| No Rotation 320Msps (IFFT 256 + 4x TDI) | 5.2030 |
| With Rotation 320Msps (IFFT 256 + 4x TDI) | 6.1574 |

| [c1 c2 c3 c4] = [1 1 -1 1] | min. PAPR [dB] |
|---|---|
| No Rotation 80Msps (IFFT 256) | 3.7411 |
| With Rotation 80Msps (IFFT 256) | 5.8951 |
| No Rotation 320Msps (IFFT 1024) | 5.3775 |
| With Rotation 320Msps (IFFT 1024) | 5.9507 |
| No Rotation 320Msps (IFFT 256 + 4x TDI) | 5.8458 |
| With Rotation 320Msps (IFFT 256 + 4x TDI) | 6.5809 |

| [c1 c2 c3 c4] = [1 -1 1 1] | min. PAPR [dB] |
|---|---|
| No Rotation 80Msps (IFFT 256) | 3.3832 |
| With Rotation 80Msps (IFFT 256) | 5.1419 |
| No Rotation 320Msps (IFFT 1024) | 4.8394 |
| With Rotation 320Msps (IFFT 1024) | 5.1419 |
| No Rotation 320Msps (IFFT 256 + 4x TDI) | 5.2522 |
| With Rotation 320Msps (IFFT 256 + 4x TDI) | 6.1559 |

| [c1 c2 c3 c4] = [-1 1 1 1] | min. PAPR [dB] |
|---|---|
| No Rotation 80Msps (IFFT 256) | 3.6671 |
| With Rotation 80Msps (IFFT 256) | 5.6003 |
| No Rotation 320Msps (IFFT 1024) | 4.9879 |
| With Rotation 320Msps (IFFT 1024) | 5.6003 |
| No Rotation 320Msps (IFFT 256 + 4x TDI) | 5.8439 |
| With Rotation 320Msps (IFFT 256 + 4x TDI) | 6.6243 |

FIG. 11A

| [c1 c2 c3 c4] = [1 j 1 -j] | min. PAPR [dB] |
|---|---|
| No Rotation 80Msps (IFFT 256) | 3.8777 |
| With Rotation 80Msps (IFFT 256) | 5.2767 |
| No Rotation 320Msps (IFFT 1024) | 5.0564 |
| With Rotation 320Msps (IFFT 1024) | 5.2767 |
| No Rotation 320Msps (IFFT 256 + 4x TDI) | 5.3391 |
| With Rotation 320Msps (IFFT 256 + 4x TDI) | 6.2642 |

| [c1 c2 c3 c4] = [1 j -1 j] | min. PAPR [dB] |
|---|---|
| No Rotation 80Msps (IFFT 256) | 3.8308 |
| With Rotation 80Msps (IFFT 256) | 5.4930 |
| No Rotation 320Msps (IFFT 1024) | 5.3966 |
| With Rotation 320Msps (IFFT 1024) | 5.5776 |
| No Rotation 320Msps (IFFT 256 + 4x TDI) | 5.5351 |
| With Rotation 320Msps (IFFT 256 + 4x TDI) | 6.4156 |

| [c1 c2 c3 c4] = [j 1 j -1] | min. PAPR [dB] |
|---|---|
| No Rotation 80Msps (IFFT 256) | 3.9705 |
| With Rotation 80Msps (IFFT 256) | 5.4930 |
| No Rotation 320Msps (IFFT 1024) | 5.2783 |
| With Rotation 320Msps (IFFT 1024) | 5.5320 |
| No Rotation 320Msps (IFFT 256 + 4x TDI) | 5.3898 |
| With Rotation 320Msps (IFFT 256 + 4x TDI) | 6.3173 |

| [c1 c2 c3 c4] = [j 1 -1 1] | min. PAPR [dB] |
|---|---|
| No Rotation 80Msps (IFFT 256) | 3.9734 |
| With Rotation 80Msps (IFFT 256) | 5.2767 |
| No Rotation 320Msps (IFFT 1024) | 5.2521 |
| With Rotation 320Msps (IFFT 1024) | 5.3885 |
| No Rotation 320Msps (IFFT 256 + 4x TDI) | 5.3045 |
| With Rotation 320Msps (IFFT 256 + 4x TDI) | 5.9596 |

FIG. 11B

| Cases | min. PAPR [dB] | [c1 c2 c3 c4] | [ interp40Null, interp80ExtraL, interp80ExtraR ] |
|---|---|---|---|
| No Rotation 80Msps (IFFT 256) | 3.3233 | [1 1 1 -1] | [1 -1 1, 1 -1 -1 -1, 1 1 1] |
| With Rotation 80Msps (IFFT 256) | 5.1419 | [1 -1 1 1] | [1 -1 1, -1 1 1, -1 -1 1] |
| No Rotation 320Msps (IFFT 1024) | 4.8187 | [1 1 1 -1] | [1 -1 1, 1 1 -1, -1 -1 1] |
| With Rotation 320Msps (IFFT 1024) | 5.1419 | [1 -1 1 1] | [1 -1 1, 1 -1 1, -1 1 1] |
| No Rotation 320Msps (IFFT 256 + 4x TDI) | 5.2030 | [1 1 1 -1] | [-1 -1 1, 1 -1 -1, 1 1 1] |
| With Rotation 320Msps (IFFT 256 + 4x TDI) | 5.9596 | [j 1 -j 1] | [1 -1 1, 1 -1 1, -1 -1 -1] |

FIG. 12

CONSTRUCTING VERY HIGH THROUGHPUT LONG TRAINING FIELD SEQUENCES

CLAIM OF PRIORITY UNDER 35 U.S.C. §119

The present Application for Patent claims benefit of Provisional Application Ser. No. 61/226,615 filed Jul. 17, 2009, and assigned to the assignee hereof and hereby expressly incorporated by reference herein.

BACKGROUND

1. Field

Certain aspects of the present disclosure generally relate to wireless communications and, more particularly, to construction of a long training field (LTF) sequence within a preamble.

2. Background

The Institute of Electrical and Electronics Engineers (IEEE) 802.11 Wide Local Area Network (WLAN) standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A VHT Long Training Field (LTF) is a part of a transmission preamble, and can be utilized at a receiver side to estimate characteristics of underlying multiple-input multiple output (MIMO) wireless channel. Methods are proposed in the present disclosure to construct the VHT-LTF sequence, while providing a low peak-to-average power ratio (PAPR) at a transmitter side.

SUMMARY

Certain aspects of the present disclosure support a method for wireless communications. The method generally includes constructing a long training field (LTF) sequence by combining a plurality of interpolating sequences and one or more other sequences repeated multiple times in an effort to reduce (or possibly minimize) a peak-to-average power ratio (PAPR) during a transmission of the constructed LTF sequence, and transmitting the constructed LTF sequence over a wireless channel by utilizing a bandwidth of a first size.

Certain aspects of the present disclosure provide an apparatus for wireless communications. The apparatus generally includes a constructing circuit configured to construct a long training field (LTF) sequence by combining a plurality of interpolating sequences and one or more other sequences repeated multiple times in an effort to reduce (or possibly minimize) a peak-to-average power ratio (PAPR) during a transmission of the constructed LTF sequence, and a transmitter configured to transmit the constructed LTF sequence over a wireless channel by utilizing a bandwidth of a first size.

Certain aspects of the present disclosure provide an apparatus for wireless communications. The apparatus generally includes means for constructing a long training field (LTF) sequence by combining a plurality of interpolating sequences and one or more other sequences repeated multiple times in an effort to reduce (or possibly minimize) a peak-to-average power ratio (PAPR) during a transmission of the constructed LTF sequence, and means for transmitting the constructed LTF sequence over a wireless channel by utilizing a bandwidth of a first size.

Certain aspects of the present disclosure provide a computer-program product for wireless communications. The computer-program product includes a computer-readable medium comprising instructions executable to construct a long training field (LTF) sequence by combining a plurality of interpolating sequences and one or more other sequences repeated multiple times in an effort to reduce (or possibly minimize) a peak-to-average power ratio (PAPR) during a transmission of the constructed LTF sequence, and transmit the constructed LTF sequence over a wireless channel by utilizing a bandwidth of a first size.

Certain aspects of the present disclosure provide a wireless node. The wireless node generally includes at least one antenna, a constructing circuit configured to construct a long training field (LTF) sequence by combining a plurality of interpolating sequences and one or more other sequences repeated multiple times in an effort to reduce (or possibly minimize) a peak-to-average power ratio (PAPR) during a transmission of the constructed LTF sequence, and a transmitter configured to transmit via the at least one antenna the constructed LTF sequence over a wireless channel by utilizing a bandwidth of a first size.

Certain aspects of the present disclosure support a method for wireless communications. The method generally includes constructing a long training field (LTF) sequence by combining a plurality of interpolating sequences with LTF symbol values associated with at least one of the IEEE 802.11n standard or the IEEE 802.11a standard, wherein the LTF symbol values cover at least a portion of bandwidth of a first size, and each of the LTF symbol values is repeated one or more times for different subcarriers, rotating phases of symbols of the LTF sequence per bandwidth of the first size in an effort to reduce (or possibly minimize) a peak-to-average power ratio (PAPR) during a transmission of the LTF sequence, and transmitting the LTF sequence over a wireless channel by utilizing a bandwidth of a second size.

Certain aspects of the present disclosure provide an apparatus for wireless communications. The apparatus generally includes a first circuit configured to construct a long training field (LTF) sequence by combining a plurality of interpolating sequences with LTF symbol values associated with at least one of the IEEE 802.11n standard or the IEEE 802.11a standard, wherein the LTF symbol values cover at least a portion of bandwidth of a first size, and each of the LTF symbol values is repeated one or more times for different subcarriers, a second circuit configured to rotate phases of symbols of the LTF sequence per bandwidth of the first size in an effort to reduce (or possibly minimize) a peak-to-average power ratio (PAPR) during a transmission of the LTF sequence, and a transmitter configured to transmit the LTF sequence over a wireless channel by utilizing a bandwidth of a second size.

Certain aspects of the present disclosure provide an apparatus for wireless communications. The apparatus generally includes means for constructing a long training field (LTF) sequence by combining a plurality of interpolating sequences with LTF symbol values associated with at least one of the IEEE 802.11n standard or the IEEE 802.11a standard, wherein the LTF symbol values cover at least a portion of bandwidth of a first size, and each of the LTF symbol values is repeated one or more times for different subcarriers, means for rotating phases of symbols of the LTF sequence per bandwidth of the first size in an effort to reduce (or possibly minimize) a peak-to-average power ratio (PAPR) during a transmission of the LTF sequence, and means for transmitting the LTF sequence over a wireless channel by utilizing a bandwidth of a second size.

Certain aspects of the present disclosure provide a computer-program product for wireless communications. The computer-program product includes a computer-readable medium comprising instructions executable to construct a long training field (LTF) sequence by combining a plurality of interpolating sequences with LTF symbol values associated with at least one of the IEEE 802.11n standard or the IEEE 802.11a standard, wherein the LTF symbol values cover at least a portion of bandwidth of a first size, and each of the LTF symbol values is repeated one or more times for different subcarriers, rotate phases of symbols of the LTF sequence per bandwidth of the first size in an effort to reduce (or possibly minimize) a peak-to-average power ratio (PAPR) during a transmission of the LTF sequence, and transmit the LTF sequence over a wireless channel by utilizing a bandwidth of a second size.

Certain aspects of the present disclosure provide a wireless node. The wireless node generally includes at least one antenna, a first circuit configured to construct a long training field (LTF) sequence by combining a plurality of interpolating sequences with LTF symbol values associated with at least one of the IEEE 802.11n standard or the IEEE 802.11a standard, wherein the LTF symbol values cover at least a portion of bandwidth of a first size, and each of the LTF symbol values is repeated one or more times for different subcarriers, a second circuit configured to rotate phases of symbols of the LTF sequence per bandwidth of the first size in an effort to reduce (or possibly minimize) a peak-to-average power ratio (PAPR) during a transmission of the LTF sequence, and a transmitter configured to transmit via the at least one antenna the LTF sequence over a wireless channel by utilizing a bandwidth of a second size.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 illustrates example of peak-to-average power ratio (PAPR) results for 80 MHz LTFs designed according to a legacy-based approach in accordance with certain aspects of the present disclosure.

FIG. 6 illustrates another example of PAPR results for 80 MHz LTFs designed according to the legacy-based approach in accordance with certain aspects of the present disclosure.

FIGS. 7A-7B illustrate example of PAPR results for 80 MHz LTFs designed based on a first new sequence in accordance with certain aspects of the present disclosure.

FIG. 8 illustrates preferred 80 MHz LTFs designed based on the first new sequence in accordance with certain aspects of the present disclosure.

FIGS. 9A-9B illustrate example of PAPR results for 80 MHz LTFs designed based on a second new sequence in accordance with certain aspects of the present disclosure.

FIG. 10 illustrates preferred 80 MHz LTFs designed based on the second new sequence in accordance with certain aspects of the present disclosure.

FIGS. 11A-11B illustrate example of PAPR results for 80 MHz LTFs designed based on a third new sequence in accordance with certain aspects of the present disclosure.

FIG. 12 illustrates preferred 80 MHz LTFs designed based on the third new sequence in accordance with certain aspects of the present disclosure.

DETAILED DESCRIPTION

Figure 1:
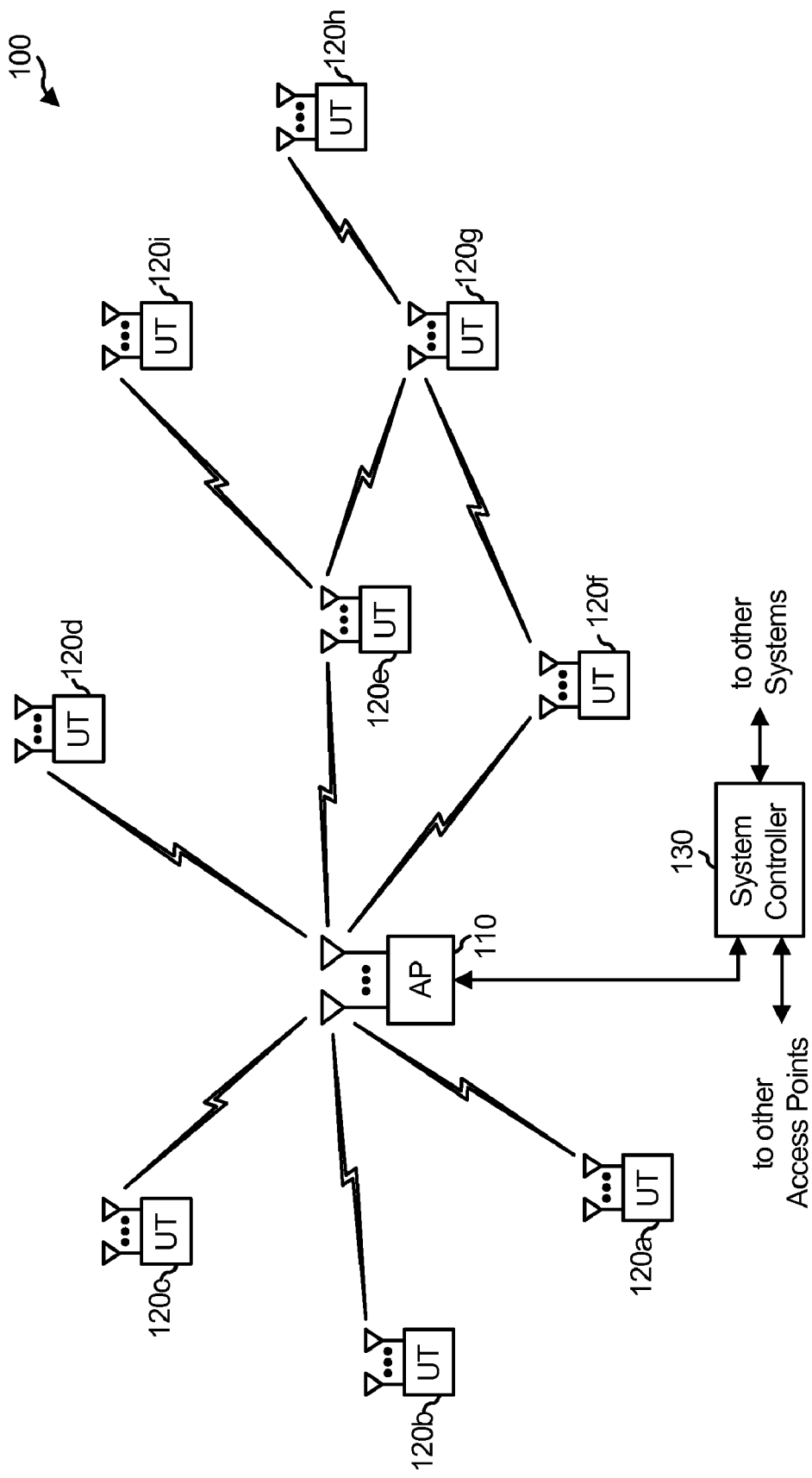
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, a headset, a sensor or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Several aspects of a wireless network will now be presented with reference to FIG. 1. The wireless network 100 is shown with several wireless nodes, generally designated as nodes 110 and 120. Each wireless node is capable of receiving and/or transmitting. In the discussion that follows the term "receiving node" may be used to refer to a node that is receiving and the term "transmitting node" may be used to refer to a node that is transmitting. Such a reference does not imply that the node is incapable of performing both transmit and receive operations.

In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console or any other suitable wireless node.

One or more access terminals 120 may be equipped with multiple antennas to enable certain functionality. With this configuration, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support multiple-input multiple-output (MIMO) technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA) or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
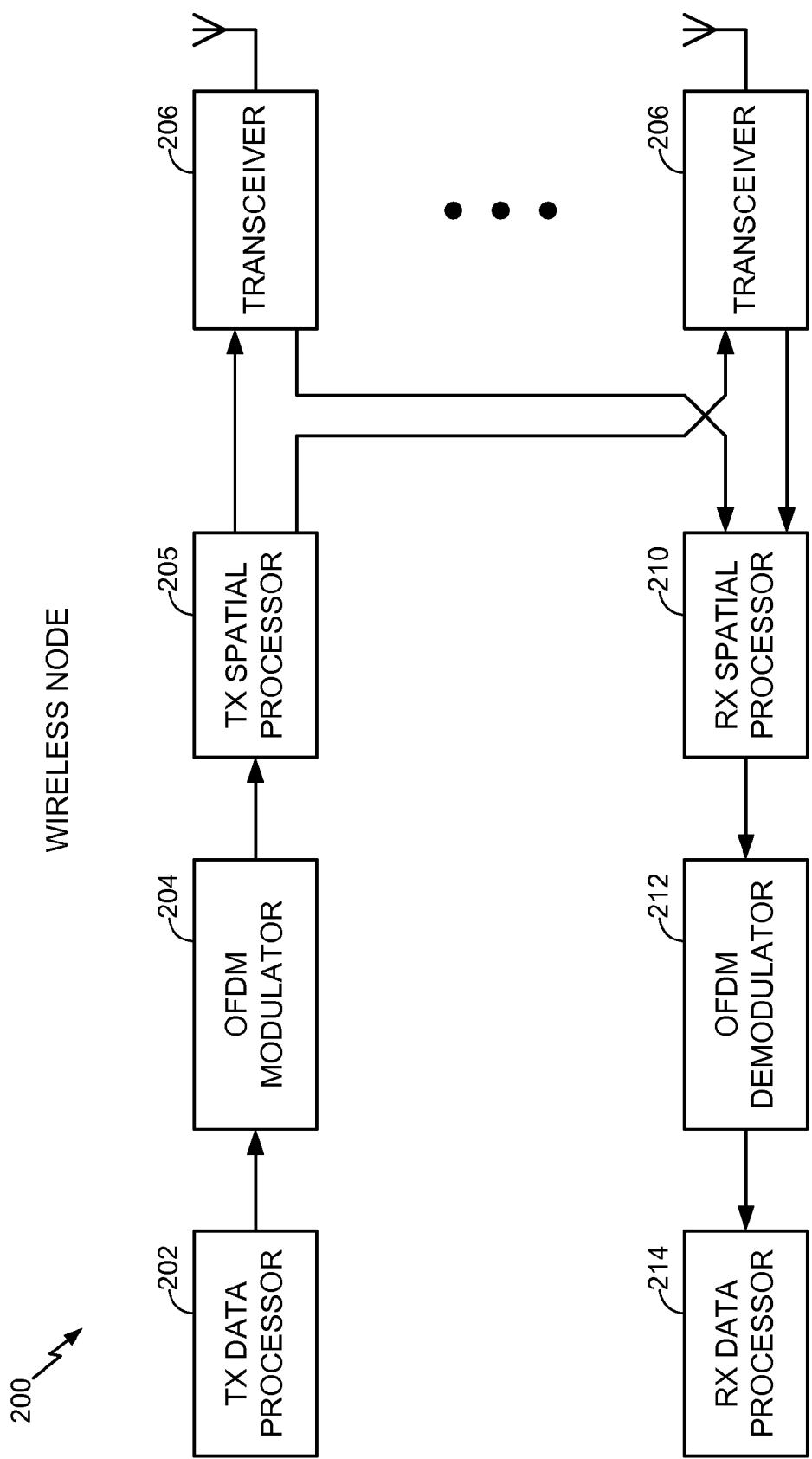
FIG. 2 illustrates a block diagram of an example of signal processing functions of a physical layer (PHY) of a wireless node in the wireless communications network of FIG. 1 in accordance with certain aspects of the present disclosure.

FIG. 2 illustrates a conceptual block diagram illustrating an example of the signal processing functions of the Physical (PHY) layer. In a transmit mode, a TX data processor 202 may be used to receive data from the Media Access Control (MAC) layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 206 performs spatial processing on the OFDM stream. This may be accomplished by spatially precoding each OFDM and then providing each spatially precoded stream to a different antenna 208 via a transceiver 206. Each transmitter 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC) or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

Figure 3:
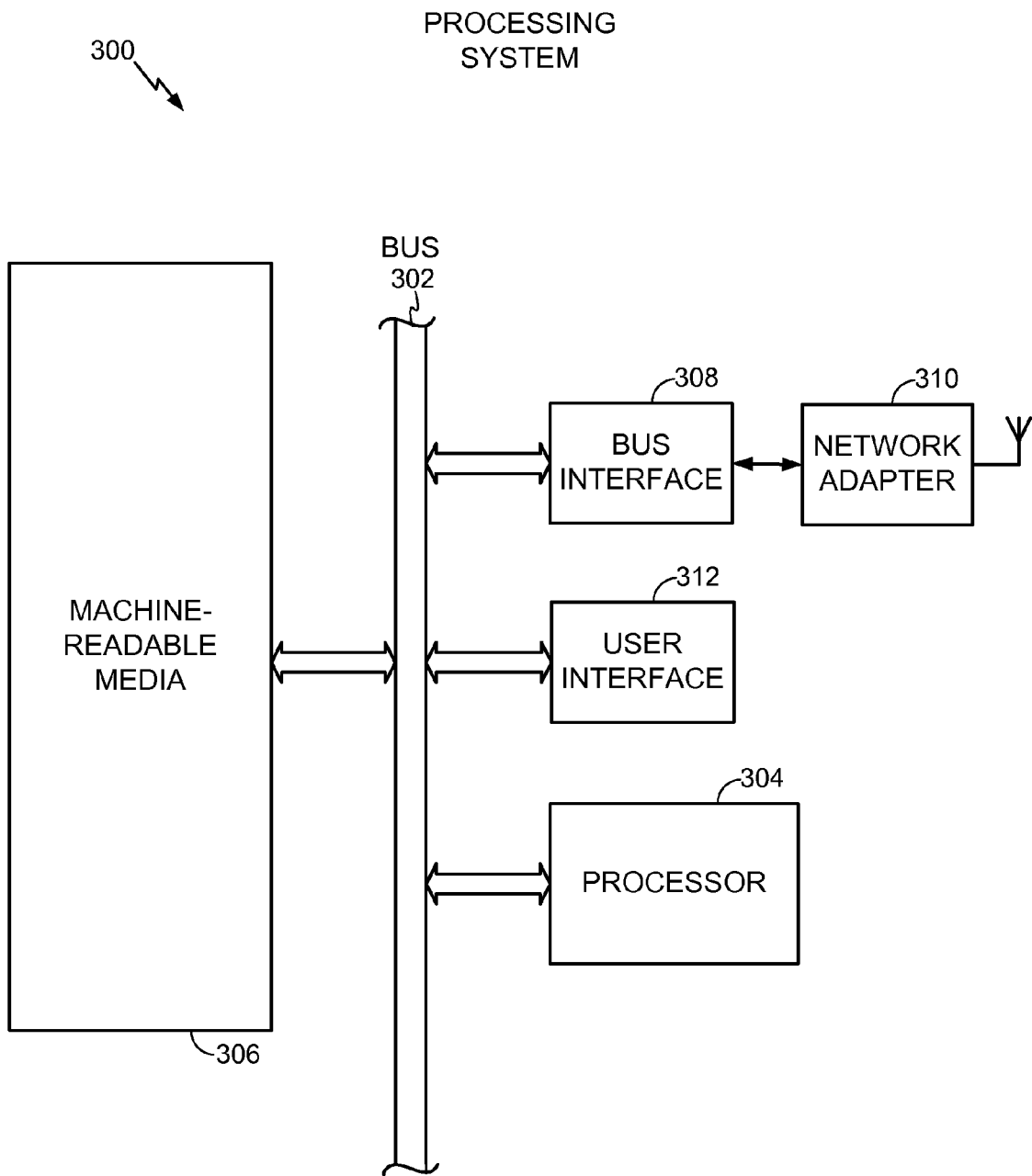
FIG. 3 illustrates a block diagram of an exemplary hardware configuration for a processing system in a wireless node in the wireless communications network of FIG. 1 in accordance with certain aspects of the present disclosure.

FIG. 3 illustrates a conceptual diagram illustrating an example of a hardware configuration for a processing system in a wireless node. In this example, the processing system 300 may be implemented with a bus architecture represented generally by bus 302. The bus 302 may include any number of interconnecting buses and bridges depending on the specific application of the processing system 300 and the overall design constraints. The bus links together various circuits including a processor 304, machine-readable media 306 and a bus interface 308. The bus interface 308 may be used to connect a network adapter 310, among other things, to the processing system 300 via the bus 302. The network adapter 310 may be used to implement the signal processing functions of the PHY layer. In the case of an access terminal 110 (see FIG. 1), a user interface 312 (e.g., keypad, display, mouse, joystick, etc.) may also be connected to the bus. The bus 302 may also link various other circuits such as timing sources, peripherals, voltage regulators, power management circuits, and the like, which are well known in the art, and therefore, will not be described any further.

The processor 304 is responsible for managing the bus and general processing, including the execution of software stored on the machine-readable media 306. The processor 304 may be implemented with one or more general-purpose and/or special-purpose processors. Examples include microprocessors, microcontrollers, DSP processors and other circuitry that can execute software. Software shall be construed broadly to mean instructions, data or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof The machine-readable media may be embodied in a computer-program product. The computer-program product may comprise packaging materials.

In the hardware implementation illustrated in FIG. 3, the machine-readable media 306 is shown as part of the processing system 300 separate from the processor 304. However, as those skilled in the art will readily appreciate, the machine-readable media 306, or any portion thereof, may be external to the processing system 300. By way of example, the machine-readable media 306 may include a transmission line, a carrier wave modulated by data, and/or a computer product separate from the wireless node, all which may be accessed by the processor 304 through the bus interface 308. Alternatively, or in addition to, the machine readable media 306, or any portion thereof, may be integrated into the processor 304, such as the case may be with cache and/or general register files.

The processing system 300 may be configured as a general-purpose processing system with one or more microprocessors providing the processor functionality and external memory providing at least a portion of the machine-readable media 306, all linked together with other supporting circuitry through an external bus architecture. Alternatively, the processing system 300 may be implemented with an ASIC (Application Specific Integrated Circuit) with the processor 304, the bus interface 308, the user interface 312 in the case of an access terminal), supporting circuitry (not shown), and at least a portion of the machine-readable media 306 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 300 depending on the particular application and the overall design constraints imposed on the overall system.

The wireless network 100 from FIG. 1 may represent the IEEE 802.11 Wide Local Area Network (WLAN) utilizing the very high throughput (VHT) protocol for signal transmissions with a carrier frequency of 5 GHz (i.e., the IEEE 802.11ac specification) or with a carrier frequency of 60 GHz (i.e., the IEEE 802.11ad specification) targeting aggregate throughputs larger than 1 Gigabits per second. The VHT 5 GHz specification may utilize a wider channel bandwidth, which may comprise two 40 MHz channels to achieve 80 MHz bandwidth therefore doubling the PHY data rate with negligible increase in cost compared to the IEEE 802.11n standard.

Certain aspects of the present disclosure support constructing a training sequence within a preamble for the VHT-based transmissions that may provide a lower peak-to-average power ratio (PAPR) than the training sequences utilized in the art.

Constructing Long Training Field Sequence for 80 MHz Bandwidth

A Very High Throughput Long Training Field (VHT-LTF) sequence of a transmission preamble may be utilized at a receiver side to estimate characteristics of a wireless channel. The 80 MHz VHT-LTF sequence may be derived based on two approaches. In one aspect of the present disclosure, the VHT-LTF may be derived by using two 40 MHz HT-LTFs to retain its low PAPR and high autocorrelation properties. To achieve this, the 40 MHz HT-LTF may be duplicated, shifted in frequency, and then extra/missing subcarriers may be filled. This approach can be referred as the "Legacy Approach" since the existing 40 MHz HT-LTF sequences may be utilized. In another aspect of the present disclosure, an entirely new LTF sequence may be constructed in order to obtain even better PAPR results. This approach can be referred as the "New Sequence" approach.

Figure 4:
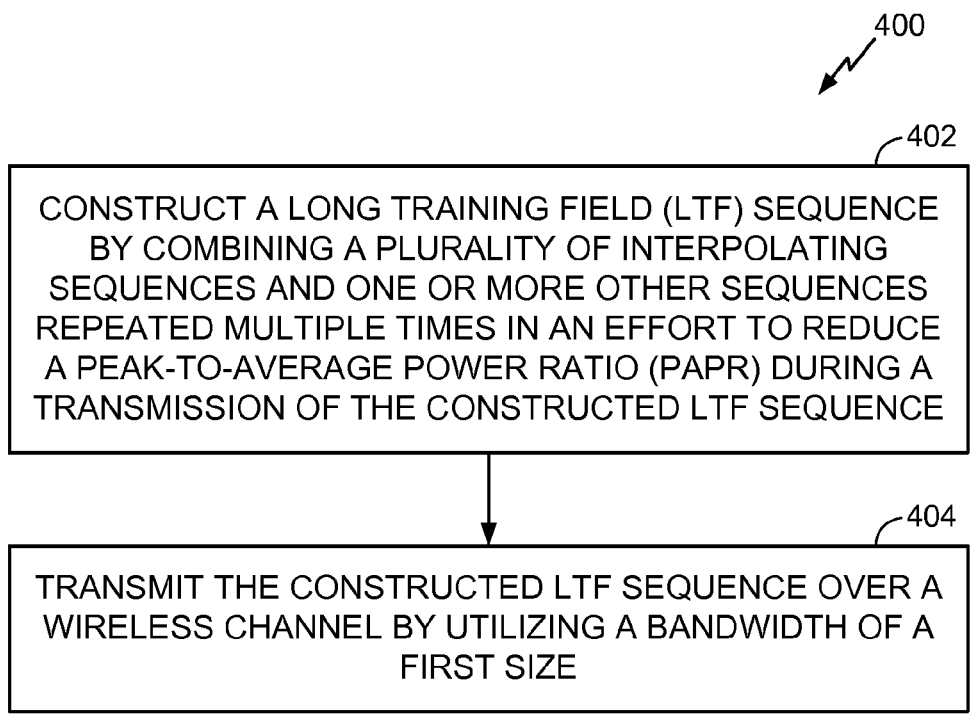
FIG. 4 illustrates example operations for constructing a very high throughput long training field (VHT-LTF) sequence for 80 MHz channel in accordance with certain aspects of the present disclosure.

FIG. 4 illustrates example operations 400 for constructing the VHT-LTF sequence for 80 MHz channel bandwidth in accordance with certain aspects of the present disclosure. At 402, the LTF sequence may be constructed by combining a plurality of interpolating sequences and one or more other sequences repeated multiple times with appropriately chosen phase rotation (e.g., as defined in FIGS. 7-12 with different rotational patterns [c1 c2 c3 c4]) in an effort to minimize (or at least reduce) the PAPR during transmission of the constructed LTF sequence. At 404, the constructed LTF sequence may be transmitted over a wireless channel by utilizing, for example, a bandwidth of 80 MHz.

Figure 13:
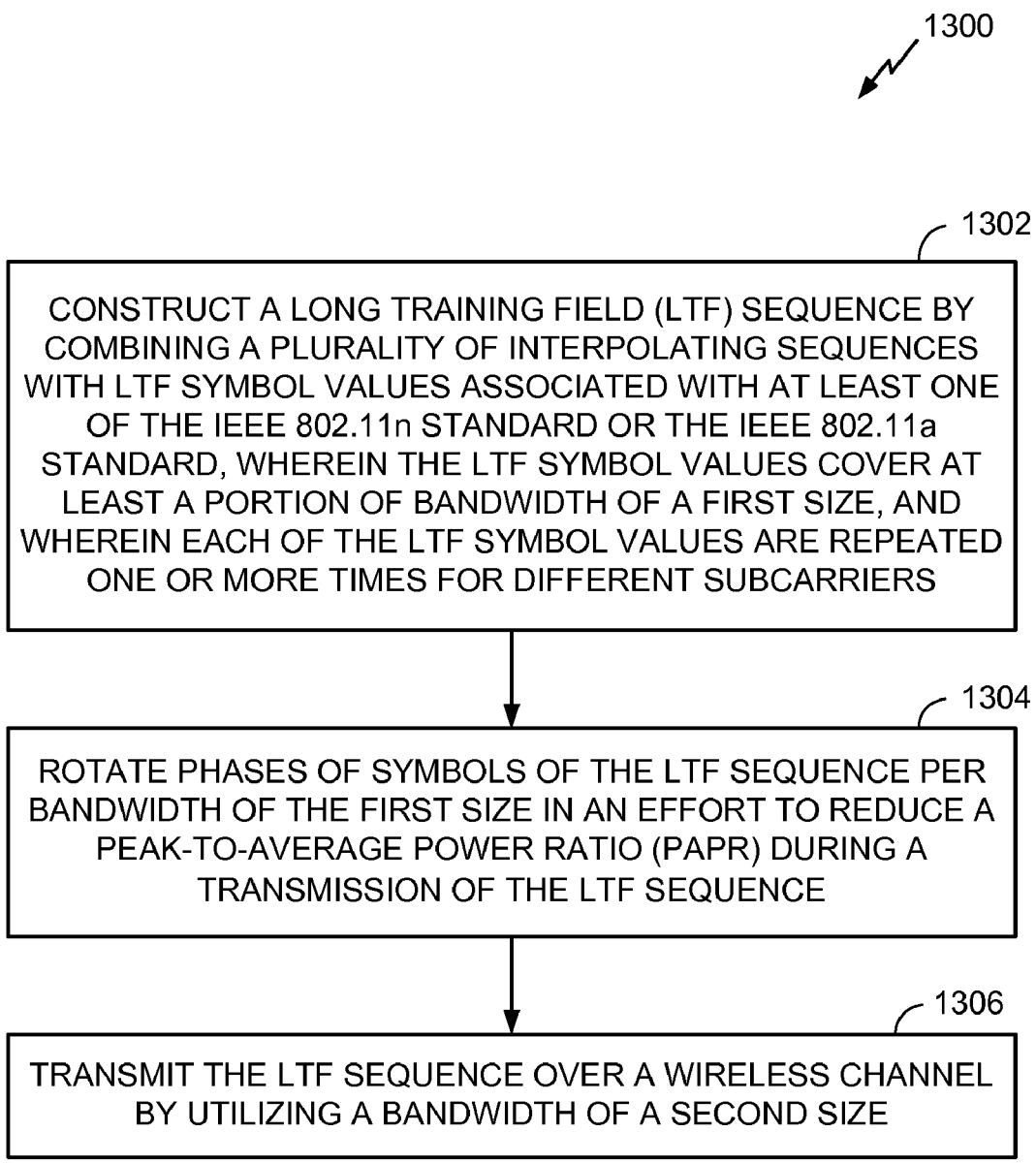
FIG. 13 illustrates other example operations for constructing a very high throughput long training field (VHT-LTF) sequence for 80 MHz channel in accordance with certain aspects of the present disclosure.

FIG. 13 illustrates example operations 1300 for constructing the VHT-LTF sequence for 80 MHz channel bandwidth in accordance with certain aspects of the present disclosure. At 1302, the LTF sequence may be constructed by combining a plurality of interpolating sequences with LTF symbol values associated with at least one of the IEEE 802.11n standard or the IEEE 802.11a standard, wherein the LTF symbol values may cover at least a portion of bandwidth of a first size, and each of the LTF symbol values may be repeated one or more times for different subcarriers. At 1304, phases of symbols of the LTF sequence may be rotated per bandwidth of the first size (e.g., as defined in FIGS. 7-12 with different values of c1, c2, c3 and c4 of rotational patterns applied per 20 MHz sub-band) in an effort to minimize (or at least reduce) the PAPR during a transmission of the LTF sequence. At 1306, the LTF sequence may be transmitted over a wireless channel by utilizing a bandwidth of a second size.

Constructing 80 MHz LTF Sequence Based on Legacy Approach

In one aspect of the present disclosure, the 80 MHz LTF sequence may be constructed by using two 40 MHz 802.11n LTFs as given by:

$$VHTLTF_{-122,122} = \{1, 1, -1, -1, 1, 1, -1, 1, -1, 1, 1, 1, 1, 1, 1, -1, -1, 1, 1, -1, 1, -1, 1, 1, 1, 1, 1,\\ 1, -1, -1, 1, 1, -1, 1, -1, 1, -1, -1, -1, -1, -1, 1, 1, -1, -1, 1, -1, 1, 1, 1, 1,\\ -1, -1, -1, 1, interp40Null, -1, 1, 1, -1,\\ 1, 1, -1, -1, 1, 1, -1, 1, -1, 1, 1, 1, 1, 1, 1, -1, -1, 1, 1, -1, 1, -1, 1, 1, 1, 1, 1,\\ 1, -1, -1, 1, 1, -1, 1, -1, 1, -1, -1, -1, -1, -1, 1, 1, -1, -1, 1, -1, 1, 1, 1, 1,\\ interp80ExtraL, 0, 0, 0, 0, 0, interp80ExtraR,\\ 1, 1, -1, -1, 1, 1, -1, 1, -1, 1, 1, 1, 1, 1, 1, -1, -1, 1, 1, -1, 1, -1, 1, 1, 1, 1, 1,\\ 1, -1, -1, 1, 1, -1, 1, -1, 1, -1, -1, -1, -1, -1, 1, 1, -1, -1, 1, -1, 1, 1, 1, 1,\\ -1, -1, -1, 1, interp40Null, -1, 1, 1, -1,\\ 1, 1, -1, -1, 1, 1, -1, 1, -1, 1, 1, 1, 1, 1, 1, -1, -1, 1, 1, -1, 1, -1, 1, 1, 1, 1, 1,\\ 1, -1, -1, 1, 1, -1, 1, -1, 1, -1, -1, -1, -1, -1, 1, 1, -1, -1, 1, -1, 1, 1, 1, 1\}.$$

(1)

It can be observed from equation (1) that there may exist five zero subcarriers around the DC tone. Vectors interp40Null, interp80ExtraL, and interp80ExtraR may represent interpolating sequences utilized to fill missing subcarrier values in LTFs for achieving a desired bandwidth, such as the bandwidth of 80 MHz. Each interpolating sequence may comprise three subcarriers in this particular case, and may be optimized in an effort to minimize (or at least reduce) the PAPR.

FIG. 5 illustrates PAPR results for 80 MHz LTFs designed based on the approach given by equation (1) in accordance with certain aspects of the present disclosure. Those cases from FIG. 5 labeled as "with rotation" refer to LTFs generated from equation (1) where the upper frequency band of 40 MHz may be rotated by 90 degrees. Approaches that utilize 256-point inverse Fourier transform (IFFT) with no oversampling before transmission (i.e., transmission rate of 80 Mega samples per second) may provide lower bounds of PAPRs for oversampling cases, and these PAPR results may correspond to preferred LTF sequences for cases with and without 90 degree phase rotation.

In the case of oversampling with the 1024-point IFFT, the PAPR results for approaches with and without phase rotation may be very close, both larger than 7 dB, as illustrated in FIG. 5. These two approaches may have different preferred LTF sequences. In the case of 256-point IFFT and oversampling with 4-times time domain interpolation (4×TDI), the PAPR results may largely depend on filtering parameters. For example, listed results in FIG. 5 may be obtained with a filter cutoff frequency of 0.25, which may be the preferred frequency for this type of filtering. The generated LTF sequence with the 90 degree phase rotation of the upper 40 MHz frequency band may provide the PAPR of 5.8816 dB, which is substantially smaller than the PAPR of 8.7891 dB obtained without the phase rotation.

The subcarrier tones may be further divided into more than two segments, and different phase rotation may be applied on each segment. This may result in even lower level of PAPR as the high PAPR may be mainly due to too many independent subcarriers added together.

If the phase rotation of the upper 40 MHz band is applied as well as the oversampling based on the TDI, then the preferred 80 MHz LTF sequence for the case defined by equation (1) is with PAPR of 5.8816 dB. This preferred LTF sequence may be given as:

$$VHTLTF_{-122,122} = \{1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$-1, -1, -1, 1, 1, -1, -1, -1, 1, 1, -1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$1, -1, 1, 0, 0, 0, 0, 0, -1, 1, -1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$-1, -1, -1, 1, 1, -1, -1, -1, 1, 1, -1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1\} \quad (2)$$

It can be observed by comparing equation (2) and equation (1) that the interpolating sequences may be given as:

$$[interp40Null, interp80ExtraL, interp80ExtraR] = [1\ -1\ -1, 1\ -1\ 1, -1\ 1\ -1] \quad (3)$$

In another aspect of the present disclosure, the 80 MHz LTF sequence may be constructed by using two 40 MHz 802.11n LTFs as given by:

$$VHTLTF_{-122,122} = \{1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$-1, -1, -1, 1, interp40Null, -1, 1, 1, -1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$interp80ExtraL, 0, 0, 0, interp80ExtraR,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$-1, -1, -1, 1, interp40Null, -1, 1, 1, -1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1\} \quad (4)$$

It can be observed from equation (4) that there may exist three zero subcarriers around the DC tone. The interpolating sequences interp40Null, interp80ExtraL, and interp80ExtraR may comprise extra tones to be chosen in an effort to minimize (or at least reduce) the PAPR.

FIG. 6 illustrates PAPR results for the 80 MHz LTFs designed based on the approach given by equation (4) in accordance with certain aspects of the present disclosure. Those cases from FIG. 6 labeled as "with rotation" refer to LTFs generated from equation (4) where phases of tones of the upper frequency band of 40 MHz may be rotated by 90 degrees.

In the case of 256-point IFFT with oversampling based on 4-times time domain interpolation (4×TDI), the PAPR results may again largely depend on filtering parameters. For example, the PAPR results from FIG. 6 may be obtained with the filter cutoff frequency of 0.25. The phase rotation of tones from the upper frequency band by 90 degrees may provide the PAPR of 6.0423 dB, as illustrated in FIG. 6, which is substantially smaller than the PAPR of 8.5841 dB obtained without phase rotation. This may represent the preferred result in the case of oversampling. It can be observed from FIGS. 5-6 that phase rotation in the upper band may substantially reduce the level of PAPR.

If the phase rotation of the upper 40 MHz band is applied as well as the oversampling based on the TDI, then the preferred 80 MHz LTF sequence for the case defined by equation (4) may provide the PAPR of 6.0423 dB (see FIG. 6). This preferred LTF sequence may be given as:

$$VHTLTF_{-122,122} = \{1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$-1, -1, -1, 1, 1, -1, -1, -1, 1, 1, -1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$-1, -1, -1, -1, 0, 0, 0, 1, 1, 1, 1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1,$$
$$-1, -1, -1, 1, 1, -1, -1, -1, 1, 1, -1,$$
$$1, 1, -1, -1, 1, 1, -1, 1, -1, 1, 1, 1, 1, 1, 1, -1, -1, 1, 1, -1, 1, -1, 1, 1, 1, 1, 1,$$
$$1, -1, -1, 1, 1, -1, 1, -1, 1, -1, -1, -1, -1, -1, 1, 1, -1, -1, 1, -1, 1, 1, 1, 1\}.$$

(5)

It can be observed by comparing equations (4) and (5) that the interpolating sequences from equation (4) may be given as:

[interp40Null,interp80ExtraL,interp80ExtraR]=
[1 −1 −1,−1 −1 −1 −1,1 1 1 1].  (6)

Constructing 80 MHz LTF Sequence Based on New Sequence Approach

The 80 MHz LTF sequence may be constructed by using four 802.11a LTF sequences in the 20 MHz subbands covered by a complementary sequence, which may be equivalent to the phase rotation on each subband. Some additional tone values may be also determined in an effort to minimize (or at least reduce) the PAPR during transmission of the LTF sequence.

In one aspect of the present disclosure, the LTF sequence may be constructed as:

$$VHTLTF_{-122,122} =$$

$$\{c1.*[1, 1, -1, -1, 1, 1, -1, 1, -1, 1, 1, 1, 1, 1, 1, -1, -1, 1, 1, -1, 1, -1, 1, 1, 1, 1, 1, \text{interp20Null}],$$
$$c1.*[1, -1, -1, 1, 1, -1, 1, -1, 1, -1, -1, -1, -1, -1, 1, 1, -1, -1, 1, -1, 1, 1, 1, 1],$$
$$\text{interp40Null},$$
$$c2.*[1, 1, -1, -1, 1, 1, -1, 1, -1, 1, 1, 1, 1, 1, 1, -1, -1, 1, 1, -1, 1, -1, 1, 1, 1, 1, 1, \text{interp20Null}],$$
$$c2.*[1, -1, -1, 1, 1, -1, 1, -1, 1, -1, -1, -1, -1, -1, 1, 1, -1, -1, 1, -1, 1, 1, 1, 1],$$
$$\text{interp80ExtraL}, 0, 0, 0, 0, 0, \text{interp80ExtraR},$$
$$c3.*[1, 1, -1, -1, 1, 1, -1, 1, -1, 1, 1, 1, 1, 1, 1, -1, -1, 1, 1, -1, 1, -1, 1, 1, 1, 1, 1, \text{interp20Null}],$$
$$c3.*[1, -1, -1, 1, 1, -1, 1, -1, 1, -1, -1, -1, -1, -1, 1, 1, -1, -1, 1, -1, 1, 1, 1, 1],$$
$$\text{interp40Null},$$
$$c4.*[1, 1, -1, -1, 1, 1, -1, 1, -1, 1, 1, 1, 1, 1, 1, -1, -1, 1, 1, -1, 1, -1, 1, 1, 1, 1, 1, \text{interp20Null}],$$
$$c4.*[1, -1, -1, 1, 1, -1, 1, -1, 1, -1, -1, -1, -1, -1, 1, 1, -1, -1, 1, -1, 1, 1, 1, 1]\}.$$

(7)

It can be observed from equation (7) that there may be five zero subcarriers around the DC tone, the interpolating sequences interp20Null, interp40Null, interp80ExtraL, interp80ExtraR may comprise extra tones to be chosen in an effort to minimize (or at least reduce) the PAPR, and [c1 c2 c3 c4] may represent the complementary sequence.

FIGS. 7A-7B illustrate an example of PAPR results for 80 MHz LTFs designed based on the approach given by equation (7) with various phase rotation patterns on 20 MHz subbands in accordance with certain aspects of the present disclosure. It can be observed from FIGS. 7A-7B that the constructed new LTF sequences based on four 20 MHz 802.11a LTFs may provide, in general, improved PAPR results compared to the previously constructed LTF sequences based on two 40 MHz 802.11n LTFs (i.e., the LTF sequences generated based on the legacy approach and given by equations (2) and (5)).

It can be also observed from FIGS. 7A-7B that the phase rotation of upper band does not result into PAPR reduction, and the PAPR results are even worse. Also, the complementary sequences [1 1 1 −1] and [1 −1 1 1] may provide better PAPR results than the sequences [1 1 −1 1] and [−1 1 1 1], while the complementary sequence [1 1 1 −1] may provide very close PAPR results to [1 −1 1 1] pattern. By using [1 j 1 −j] complementary sequence combined with 90 degree phase rotation of the upper 40 MHz band and oversampling based on time domain interpolation, the constructed new LTF sequences based on four 20 MHz 802.11a LTFs may provide the PAPR of 5.8913 dB. It can be observed that this PAPR result is comparable with the PAPR result of 5.8816 dB (see FIG. 5) of the LTF sequence defined by equation (2) which is constructed based on two 40 MHz 802.11n LTFs.

The preferred 80 MHz LTF sequence constructed based on four 20 MHz 802.11a LTFs and on a complementary sequence may be given as:

$$VHTLTF_{-122,122} = \qquad (8)$$

$$\{c1.*[1, 1, -1, -1, 1, 1, -1, 1, -1, 1, 1, 1, 1, 1, 1, -1, -1, 1, 1, -1, 1, -1, 1, 1, 1, 1, 1, interp20Null],$$
$$c1.*[1, -1, -1, 1, 1, -1, 1, -1, 1, -1, -1, -1, -1, -1, 1, 1, -1, -1, 1, -1, 1, 1, 1, 1],$$
$$interp40Null,$$
$$c2.*[1, 1, -1, -1, 1, 1, -1, 1, -1, 1, 1, 1, 1, 1, 1, -1, -1, 1, 1, -1, 1, -1, 1, 1, 1, 1, 1, interp20Null],$$
$$c2.*[1, -1, -1, 1, 1, -1, 1, -1, 1, -1, -1, -1, -1, -1, 1, 1, -1, -1, 1, -1, 1, 1, 1, 1],$$
$$interp80ExtraL, 0, 0, 0, 0, 0, interp80ExtraR,$$
$$c3.*[1, 1, -1, -1, 1, 1, -1, 1, -1, 1, 1, 1, 1, 1, 1, -1, -1, 1, 1, -1, 1, -1, 1, 1, 1, 1, 1, interp20Null],$$
$$c3.*[1, -1, -1, 1, 1, -1, 1, -1, 1, -1, -1, -1, -1, -1, 1, 1, -1, -1, 1, -1, 1, 1, 1, 1],$$
$$interp40Null,$$
$$c4.*[1, 1, -1, -1, 1, 1, -1, 1, -1, 1, 1, 1, 1, 1, 1, -1, -1, 1, 1, -1, 1, -1, 1, 1, 1, 1, 1, interp20Null],$$
$$c4.*[1, -1, -1, 1, 1, -1, 1, -1, 1, -1, -1, -1, -1, -1, 1, 1, -1, -1, 1, -1, 1, 1, 1, 1]\}.$$

where the interpolating sequences interp20Null, interp40Null, interp80ExtraL, interp80ExtraR and the rotation pattern [c1 c2 c3 c4] are given in FIG. 8 for various non-oversampling and oversampling cases.

In another aspect of the present disclosure, the 80 MHz LTF sequence may be constructed by using all 20 MHz 802.11a and 40 MHz 802.11n tones. Thus, in any 20 MHz subband, every tone that may be present in 20 MHz 802.11a or in 40 MHz 802.11n may have the value of corresponding tone from the 20 MHz LTF sequence or the 40 MHz HT-LTF sequence. In addition, the complementary phase rotation sequence may be applied per 20 MHz 802.11a bandwidth (i.e., 802.11a tones may be rotated), and a few missing tones may be filled.

The constructed 80 MHz LTF sequence may be given as:

$$VHTLTF_{-122,122} = \qquad (9)$$

$$\{c1.*[1, 1, -1, -1, 1, 1, -1, 1, -1, 1, 1, 1, 1, 1, 1, -1, -1, 1, 1, -1, 1, -1, 1, 1, 1, 1, 1],$$
$$c1.*[1, -1, -1, 1, 1, -1, 1, -1, 1, -1, -1, -1, -1, -1, 1, 1, -1, -1, 1, -1, 1, 1, 1, 1],$$
$$-1, -1, -1, 1, interp40Null, -1, 1, 1, -1,$$
$$c2.*[1, 1, -1, -1, 1, 1, -1, 1, -1, 1, 1, 1, 1, 1, 1, -1, -1, 1, 1, -1, 1, -1, 1, 1, 1, 1, 1],$$
$$c2.*[1, -1, -1, 1, 1, -1, 1, -1, 1, -1, -1, -1, -1, -1, 1, 1, -1, -1, 1, -1, 1, 1, 1, 1],$$
$$interp80ExtraL, 0, 0, 0, 0, 0, interp80ExtraR,$$
$$c3.*[1, 1, -1, -1, 1, 1, -1, 1, -1, 1, 1, 1, 1, 1, 1, -1, -1, 1, 1, -1, 1, -1, 1, 1, 1, 1, 1],$$
$$c3.*[1, -1, -1, 1, 1, -1, 1, -1, 1, -1, -1, -1, -1, -1, 1, 1, -1, -1, 1, -1, 1, 1, 1, 1],$$
$$-1, -1, -1, 1, interp40Null, -1, 1, 1, -1,$$
$$c4.*[1, 1, -1, -1, 1, 1, -1, 1, -1, 1, 1, 1, 1, 1, 1, -1, -1, 1, 1, -1, 1, -1, 1, 1, 1, 1, 1],$$
$$c4.*[1, -1, -1, 1, 1, -1, 1, -1, 1, -1, -1, -1, -1, -1, 1, 1, -1, -1, 1, -1, 1, 1, 1, 1]\}.$$

It can be observed from equation (9) that there may be five subcarriers around the DC tone, interpolating sequences interp40Null, interp80ExtraL, interp80ExtraR may comprise extra tones to be chosen in an effort to minimize (or at least reduce) the PAPR, and [c1 c2 c3 c4] may represent the complementary sequence. The advantage of this scheme is that there may be no need to store different values for existing 20 MHz 802.11a and 40 MHz 802.11n tones. On the other hand, the level of PAPR may be slightly higher because of less extra tones to be chosen to reduce the PAPR.

FIGS. 9A-9B illustrate an example of PAPR results for 80 MHz LTFs designed based on the approach defined by equation (9) in accordance with certain aspects of the present disclosure. The newly generated LTF sequence given by equation (9) may represent a subset of the previously generated LTF sequence defined by equation (7). Therefore, achieved PAPR results may not be better than those illustrated in FIGS. 7A-7B.

The preferred 80 MHz LTF sequence constructed based on all 20 MHz 802.11a and 40 MHz 802.11n tones and on phase rotation of 20 MHz 802.11a subbands may be given as:

$$VHTLTF_{-122,122} = \\ \{c_1 * [1, 1, -1, -1, 1, 1, -1, 1, -1, 1, 1, 1, 1, 1, 1, -1, -1, 1, 1, -1, 1, -1, 1, 1, 1, 1, 1], \\ c_1 * [1, -1, -1, 1, 1, -1, 1, -1, 1, -1, -1, -1, -1, -1, 1, 1, -1, -1, 1, -1, 1, 1, 1, 1], \\ -1, -1, -1, 1, \text{interp40Null}, -1, 1, 1, -1, \\ c_2 * [1, 1, -1, -1, 1, 1, -1, 1, -1, 1, 1, 1, 1, 1, 1, -1, -1, 1, 1, -1, 1, -1, 1, 1, 1, 1, 1], \\ c_2 * [1, -1, -1, 1, 1, -1, 1, -1, 1, -1, -1, -1, -1, -1, 1, 1, -1, -1, 1, -1, 1, 1, 1, 1], \\ \text{interp80ExtraL}, 0, 0, 0, 0, 0, \text{interp80ExtraR}, \\ c_3 * [1, 1, -1, -1, 1, 1, -1, 1, -1, 1, 1, 1, 1, 1, 1, -1, -1, 1, 1, -1, 1, -1, 1, 1, 1, 1, 1], \\ c_3 * [1, -1, -1, 1, 1, -1, 1, -1, 1, -1, -1, -1, -1, -1, 1, 1, -1, -1, 1, -1, 1, 1, 1, 1], \\ -1, -1, -1, 1, \text{interp40Null}, -1, 1, 1, -1, \\ c_4 * [1, 1, -1, -1, 1, 1, -1, 1, -1, 1, 1, 1, 1, 1, 1, -1, -1, 1, 1, -1, 1, -1, 1, 1, 1, 1, 1], \\ c_4 * [1, -1, -1, 1, 1, -1, 1, -1, 1, -1, -1, -1, -1, -1, 1, 1, -1, -1, 1, -1, 1, 1, 1, 1]\}.$$

(10)

where the interpolating sequences interp40Null, interp80ExtraL, interp80ExtraR and the rotation pattern [c1 c2 c3 c4] from equation (10) are defined in FIG. 10 for various non-oversampling and oversampling cases.

In yet another aspect of the present disclosure, the 80 MHz LTF sequence may be constructed by slightly modifying the constructed LTF sequence defined by equation (9). All 20 MHz 802.11a and 40 MHz 802.11n tones may be utilized along with the complementary sequence phase rotation applied on each 20 MHz bandwidth (i.e., 20 MHz 802.11a tones plus extra data tones of 40 MHz 802.11n). Also, a few missing tones may be filled. Therefore, the constructed 80 MHz LTF sequence may be given as:

$$VHTLTF_{-122,122} = \\ \{c_1 * [1, 1, -1, -1, 1, 1, -1, 1, -1, 1, 1, 1, 1, 1, 1, -1, -1, 1, 1, -1, 1, -1, 1, 1, 1, 1, 1], \\ c_1 * [1, -1, -1, 1, 1, -1, 1, -1, 1, -1, -1, -1, -1, -1, 1, 1, -1, -1, 1, -1, 1, 1, 1, 1], \\ c_1 * [-1, -1, -1, 1], \text{interp40Null}, c_2 * [-1, 1, 1, -1], \\ c_2 * [1, 1, -1, -1, 1, 1, -1, 1, -1, 1, 1, 1, 1, 1, 1, -1, -1, 1, 1, -1, 1, -1, 1, 1, 1, 1, 1], \\ c_2 * [1, -1, -1, 1, 1, -1, 1, -1, 1, -1, -1, -1, -1, -1, 1, 1, -1, -1, 1, -1, 1, 1, 1, 1], \\ \text{interp80ExtraL}, 0, 0, 0, 0, 0, \text{interp80ExtraR}, \\ c_3 * [1, 1, -1, -1, 1, 1, -1, 1, -1, 1, 1, 1, 1, 1, 1, -1, -1, 1, 1, -1, 1, -1, 1, 1, 1, 1, 1], \\ c_3 * [1, -1, -1, 1, 1, -1, 1, -1, 1, -1, -1, -1, -1, -1, 1, 1, -1, -1, 1, -1, 1, 1, 1, 1], \\ c_3 * [-1, -1, -1, 1], \text{interp40Null}, c_4 * [-1, 1, 1, -1], \\ c_4 * [1, 1, -1, -1, 1, 1, -1, 1, -1, 1, 1, 1, 1, 1, 1, -1, -1, 1, 1, -1, 1, -1, 1, 1, 1, 1, 1], \\ c_4 * [1, -1, -1, 1, 1, -1, 1, -1, 1, -1, -1, -1, -1, -1, 1, 1, -1, -1, 1, -1, 1, 1, 1, 1]\}.$$

(11)

It can be observed from equation (11) that there may be five subcarriers around the DC tone, interpolating sequences interp40Null, interp80ExtraL, interp80ExtraR may comprise extra tones to be chosen in an effort to minimize (or at least reduce) the PAPR, and [c1 c2 c3 c4] may represent the complementary sequence. The newly generated sequence defined by equation (11) may be different in rotation tone coverage from the LTF sequences defined by equations (7) and (9). The advantage of this particular scheme is that there may be no need to store different values for existing 20 MHz 802.11a and 40 MHz 802.11n tones. On the other hand, the PAPR may be slightly worse because of less extra tones to be optimized in an effort to minimize (or at least reduce) the PAPR.

FIGS. 11A-11B illustrate an example of PAPR results for 80 MHz LTFs designed based on the approach given by equation (11) in accordance with certain aspects of the present disclosure. The best PAPR result for the case of "No rotation 80 Msps" (i.e., 256-point IFFT) is 3.3233 dB, which is even better than that of the LTF sequence defined by equation (7) (i.e., the PAPR of 3.4239 dB from FIG. 8) due to different rotation tone coverage.

The preferred 80 MHz LTF sequence constructed based on all 20 MHz 802.11a and 40 MHz 802.11n tones and on phase rotation of 20 MHz subbands may be given as:

$$VHTLFTF_{-122,122} = \begin{aligned} &\{c1.*[1, 1, -1, -1, 1, 1, -1, 1, -1, 1, 1, 1, 1, 1, 1, -1, -1, 1, 1, -1, 1, -1, 1, 1, 1, 1, 1], \\ &c1.*[1, -1, -1, 1, 1, -1, 1, -1, 1, -1, -1, -1, -1, -1, 1, 1, -1, -1, 1, -1, 1, 1, 1, 1], \\ &c1.*[-1, -1, -1, 1], interp40Null, c2.*[-1, 1, 1, -1], \\ &c2.*[1, 1, -1, -1, 1, 1, -1, 1, -1, 1, 1, 1, 1, 1, 1, -1, -1, 1, 1, -1, 1, -1, 1, 1, 1, 1, 1], \\ &c2.*[1, -1, -1, 1, 1, -1, 1, -1, 1, -1, -1, -1, -1, -1, 1, 1, -1, -1, 1, -1, 1, 1, 1, 1], \\ &interp80ExtraL, 0, 0, 0, 0, 0, interp80ExtraR, \\ &c3.*[1, 1, -1, -1, 1, 1, -1, 1, -1, 1, 1, 1, 1, 1, 1, -1, -1, 1, 1, -1, 1, -1, 1, 1, 1, 1, 1], \\ &c3.*[1, -1, -1, 1, 1, -1, 1, -1, 1, -1, -1, -1, -1, -1, 1, 1, -1, -1, 1, -1, 1, 1, 1, 1], \\ &c3.*[-1, -1, -1, 1], interp40Null, c4.*[-1, 1, 1, -1], \\ &c4.*[1, 1, -1, -1, 1, 1, -1, 1, -1, 1, 1, 1, 1, 1, 1, -1, -1, 1, 1, -1, 1, -1, 1, 1, 1, 1, 1], \\ &c4.*[1, -1, -1, 1, 1, -1, 1, -1, 1, -1, -1, -1, -1, -1, 1, 1, -1, -1, 1, -1, 1, 1, 1, 1]\}. \end{aligned} \quad (12)$$

where the interpolating sequences interp40Null, interp80ExtraL, interp80ExtraR and the rotation pattern [c1 c2 c3 c4] from equation (12) are defined in FIG. 12 for various non-oversampling and oversampling cases.

The proposed approach for designing LTF sequences may be also utilized for other numbers of subcarrier tones. For example, in the case of IEEE 802.11ac specification, a few tones may be zeroed out at the band edges. Alternatively, all tones around the DC tone may be utilized.

Figure 4A:
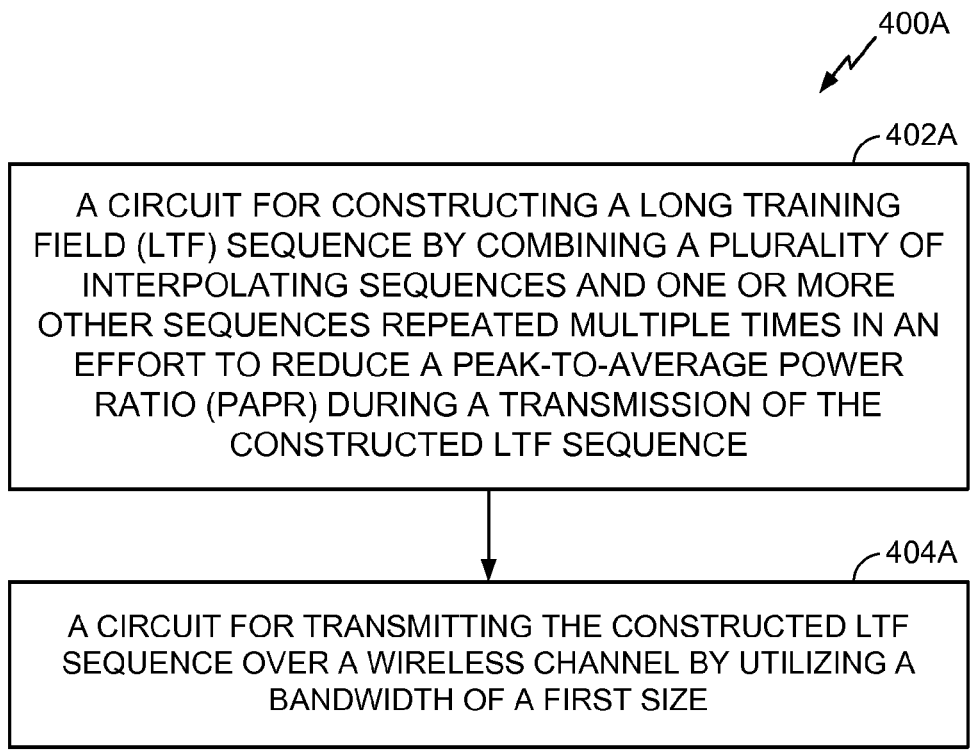
FIG. 4A illustrates example components capable of performing the operations illustrated in FIG. 4.
Figure 13A:
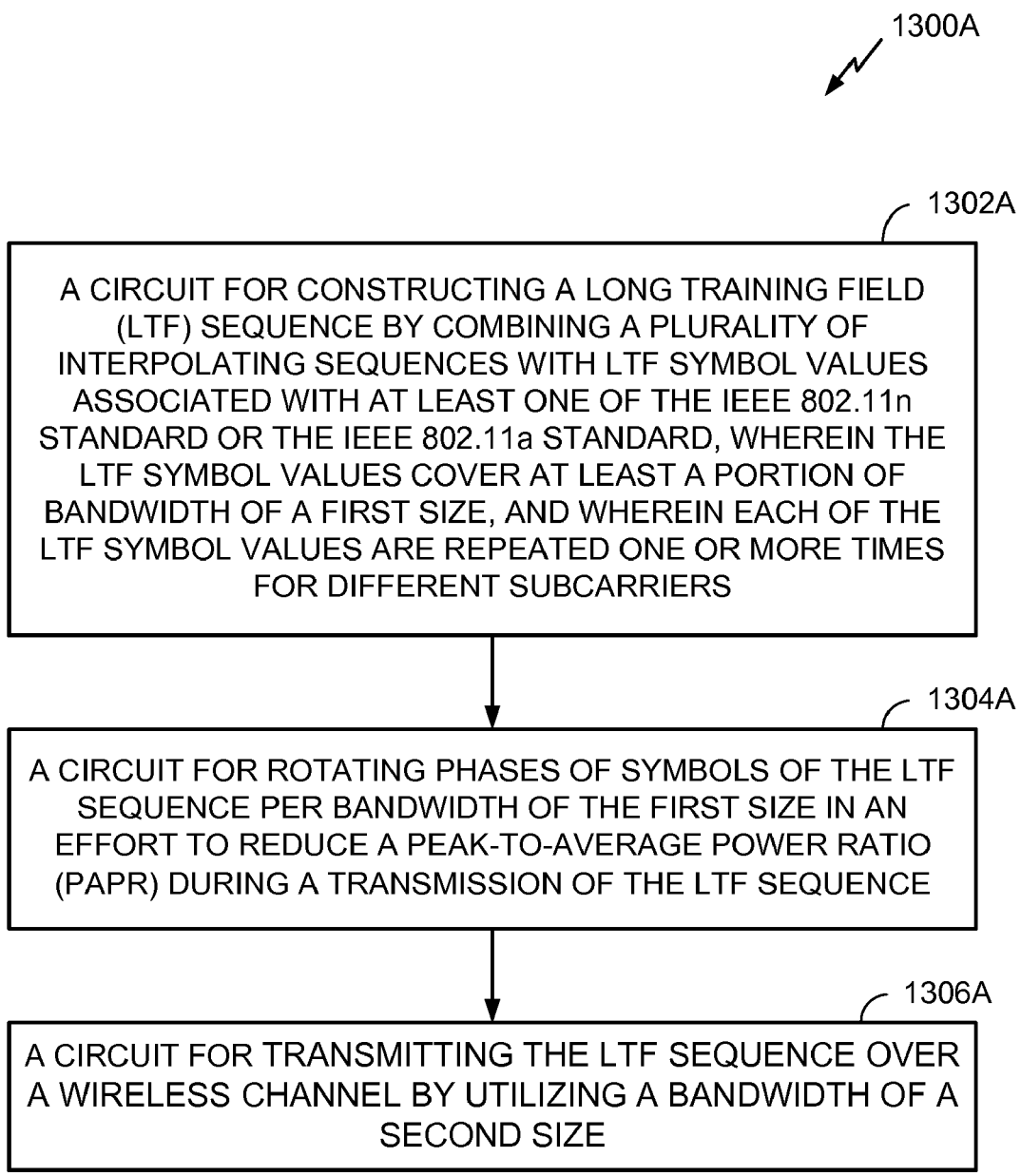
FIG. 13A illustrates example components capable of performing the operations illustrated in FIG. 13.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 402-404 and 1302-1306 illustrated in FIG. 4 and FIG. 13 correspond to circuit blocks 402A-404A and 1302A-1306A illustrated in FIG. 4A and FIG. 13A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
constructing a long training field (LTF) sequence by combining a plurality of interpolating sequences and one or more other sequences repeated multiple times in an effort to reduce a peak-to-average power ratio (PAPR) during a transmission of the constructed LTF sequence; and
transmitting the constructed LTF sequence over a wireless channel by utilizing a bandwidth of a first size.

2. The method of claim 1, wherein constructing the LTF sequence comprises:
designing the plurality of interpolating sequences in an effort to reduce the PAPR.

3. The method of claim 2, wherein constructing the LTF sequence comprises:
rotating phases of a plurality of symbols within the one or more other sequences in an effort to reduce the PAPR.

4. The method of claim 3, wherein one or more portions of the one or more other sequences are designed in an effort to reduce the PAPR.

5. The method of claim 3, wherein one or more portions of one or more sequences of the plurality of interpolating sequences are designed in an effort to reduce the PAPR.

6. The method of claim 1, wherein constructing the LTF sequence comprises:
rotating phases of a plurality of symbols of the constructed LTF sequence in an effort to reduce the PAPR, wherein the plurality of symbols belong to a portion of the bandwidth.

7. The method of claim 6, further comprising:
performing oversampling prior to the transmission.

8. The method of claim 1, wherein the bandwidth of the first size comprises a bandwidth of 80 MHz.

9. An apparatus for wireless communications, comprising:
a constructing circuit configured to construct a long training field (LTF) sequence by combining a plurality of interpolating sequences and one or more other sequences repeated multiple times in an effort to reduce a peak-to-average power ratio (PAPR) during a transmission of the constructed LTF sequence; and
a transmitter configured to transmit the constructed LTF sequence over a wireless channel by utilizing a bandwidth of a first size.

10. The apparatus of claim 9, wherein the constructing circuit is also configured to design the plurality of interpolating sequences in an effort to reduce the PAPR.

11. The apparatus of claim 10, wherein the constructing circuit is also configured to rotate phases of a plurality of symbols within the one or more other sequences in an effort to reduce the PAPR.

12. The apparatus of claim 11, wherein one or more portions of the one or more other sequences are designed in an effort to reduce the PAPR.

13. The apparatus of claim 11, wherein one or more portions of one or more sequences of the plurality of interpolating sequences are designed in an effort to reduce the PAPR.

14. The apparatus of claim 9, wherein the constructing circuit is also configured to:

rotate phases of a plurality of symbols of the constructed LTF sequence in an effort to reduce the PAPR, wherein the plurality of symbols belong to a portion of the bandwidth.

15. The apparatus of claim 14, further comprising:
a sampler configured to perform oversampling prior to the transmission.

16. The apparatus of claim 9, wherein the bandwidth of the first size comprises a bandwidth of 80 MHz.

17. An apparatus for wireless communications, comprising:
means for constructing a long training field (LTF) sequence by combining a plurality of interpolating sequences and one or more other sequences repeated multiple times in an effort to reduce a peak-to-average power ratio (PAPR) during a transmission of the constructed LTF sequence; and
means for transmitting the constructed LTF sequence over a wireless channel by utilizing a bandwidth of a first size.

18. The apparatus of claim 17, wherein the means for constructing the LTF sequence comprises:
means for designing the plurality of interpolating sequences in an effort to reduce the PAPR.

19. The apparatus of claim 18, wherein the means for constructing the LTF sequence comprises:
means for rotating phases of a plurality of symbols within the one or more other sequences in an effort to reduce the PAPR.

20. The apparatus of claim 19, wherein one or more portions of the one or more other sequences are designed in an effort to reduce the PAPR.

21. The apparatus of claim 19, wherein one or more portions of one or more sequences of the plurality of interpolating sequences are designed in an effort to reduce the PAPR.

22. The apparatus of claim 17, wherein the means for constructing the LTF sequence comprises:
means for rotating phases of a plurality of symbols of the constructed LTF sequence in an effort to reduce the PAPR, wherein the plurality of symbols belong to a portion of the bandwidth.

23. The apparatus of claim 22, further comprising:
means for performing oversampling prior to the transmission.

24. The apparatus of claim 17, wherein the bandwidth of the first size comprises a bandwidth of 80 MHz.

25. A computer-program product for wireless communications, comprising a computer-readable medium comprising instructions executable to:
construct a long training field (LTF) sequence by combining a plurality of interpolating sequences and one or more other sequences repeated multiple times in an effort to reduce a peak-to-average power ratio (PAPR) during a transmission of the constructed LTF sequence; and
transmit the constructed LTF sequence over a wireless channel by utilizing a bandwidth of a first size.

26. A wireless node, comprising:
at least one antenna;
a constructing circuit configured to construct a long training field (LTF) sequence by combining a plurality of interpolating sequences and one or more other sequences repeated multiple times in an effort to reduce a peak-to-average power ratio (PAPR) during a transmission of the constructed LTF sequence; and
a transmitter configured to transmit via the at least one antenna the constructed LTF sequence over a wireless channel by utilizing a bandwidth of a first size.

27. A method for wireless communications, comprising:
constructing a long training field (LTF) sequence by combining a plurality of interpolating sequences with LTF symbol values associated with at least one of the IEEE 802.11n standard or the IEEE 802.11a standard, wherein
the LTF symbol values cover at least a portion of bandwidth of a first size, and
each of the LTF symbol values is repeated one or more times for different subcarriers;
rotating phases of symbols of the LTF sequence per bandwidth of the first size in an effort to reduce a peak-to-average power ratio (PAPR) during a transmission of the LTF sequence; and
transmitting the LTF sequence over a wireless channel by utilizing a bandwidth of a second size.

28. The method of claim 27, wherein constructing the LTF sequence comprises:
designing the plurality of interpolating sequences in an effort to reduce the PAPR.

29. The method of claim 27, wherein the bandwidth of the first size comprises a bandwidth of 20 MHz.

30. The method of claim 27, wherein the bandwidth of the first size comprises a bandwidth of 40 MHz.

31. The method of claim 27, wherein the bandwidth of the second size comprises a bandwidth of 80 MHz.

32. The method of claim 27, further comprising:
rotating phases of a plurality of symbols of the LTF sequence in an effort to reduce the PAPR, wherein the plurality of symbols belong to a portion of the bandwidth of the second size.

33. The method of claim 32, further comprising:
performing oversampling prior to the transmission.

34. An apparatus for wireless communications, comprising:
a first circuit configured to construct a long training field (LTF) sequence by combining a plurality of interpolating sequences with LTF symbol values associated with at least one of the IEEE 802.11n standard or the IEEE 802.11a standard, wherein
the LTF symbol values cover at least a portion of bandwidth of a first size, and
each of the LTF symbol values is repeated one or more times for different subcarriers;
a second circuit configured to rotate phases of symbols of the LTF sequence per bandwidth of the first size in an effort to reduce a peak-to-average power ratio (PAPR) during a transmission of the LTF sequence; and
a transmitter configured to transmit the LTF sequence over a wireless channel by utilizing a bandwidth of a second size.

35. The apparatus of claim 34, wherein the first circuit is also configured to design the plurality of interpolating sequences in an effort to reduce the PAPR.

36. The apparatus of claim 34, wherein the bandwidth of the first size comprises a bandwidth of 20 MHz.

37. The apparatus of claim 34, wherein the bandwidth of the first size comprises a bandwidth of 40 MHz.

38. The apparatus of claim 34, wherein the bandwidth of the second size comprises a bandwidth of 80 MHz.

39. The apparatus of claim 34, further comprising:
a third circuit configured to rotate phases of a plurality of symbols of the LTF sequence in an effort to reduce the PAPR, wherein the plurality of symbols belong to a portion of the bandwidth of the second size.

40. The apparatus of claim 39, further comprising:
a sampler configured to perform oversampling prior to the transmission.

41. An apparatus for wireless communications, comprising:
   means for constructing a long training field (LTF) sequence by combining a plurality of interpolating sequences with LTF symbol values associated with at least one of the IEEE 802.11n standard or the IEEE 802.11a standard, wherein
   the LTF symbol values cover at least a portion of bandwidth of a first size, and
   each of the LTF symbol values is repeated one or more times for different subcarriers;
   means for rotating phases of symbols of the LTF sequence per bandwidth of the first size in an effort to reduce a peak-to-average power ratio (PAPR) during a transmission of the LTF sequence; and
   means for transmitting the LTF sequence over a wireless channel by utilizing a bandwidth of a second size.

42. A computer-program product for wireless communications, comprising a computer-readable medium comprising instructions executable to:
   construct a long training field (LTF) sequence by combining a plurality of interpolating sequences with LTF symbol values associated with at least one of the IEEE 802.11n standard or the IEEE 802.11a standard, wherein
   the LTF symbol values cover at least a portion of bandwidth of a first size, and
   each of the LTF symbol values is repeated one or more times for different subcarriers;
   rotate phases of symbols of the LTF sequence per bandwidth of the first size in an effort to reduce a peak-to-average power ratio (PAPR) during a transmission of the LTF sequence; and
   transmit the LTF sequence over a wireless channel by utilizing a bandwidth of a second size.

43. A wireless node, comprising:
   at least one antenna;
   a first circuit configured to construct a long training field (LTF) sequence by combining a plurality of interpolating sequences with LTF symbol values associated with at least one of the IEEE 802.11n standard or the IEEE 802.11a standard, wherein
   the LTF symbol values cover at least a portion of bandwidth of a first size, and
   each of the LTF symbol values is repeated one or more times for different subcarriers;
   a second circuit configured to rotate phases of symbols of the LTF sequence per bandwidth of the first size in an effort to reduce a peak-to-average power ratio (PAPR) during a transmission of the LTF sequence; and
   a transmitter configured to transmit via the at least one antenna the LTF sequence over a wireless channel by utilizing a bandwidth of a second size.

* * * * *